INVENTOR:
ROBERT F. McCORMICK
BY Frederick Breitenfeld
ATTORNEY

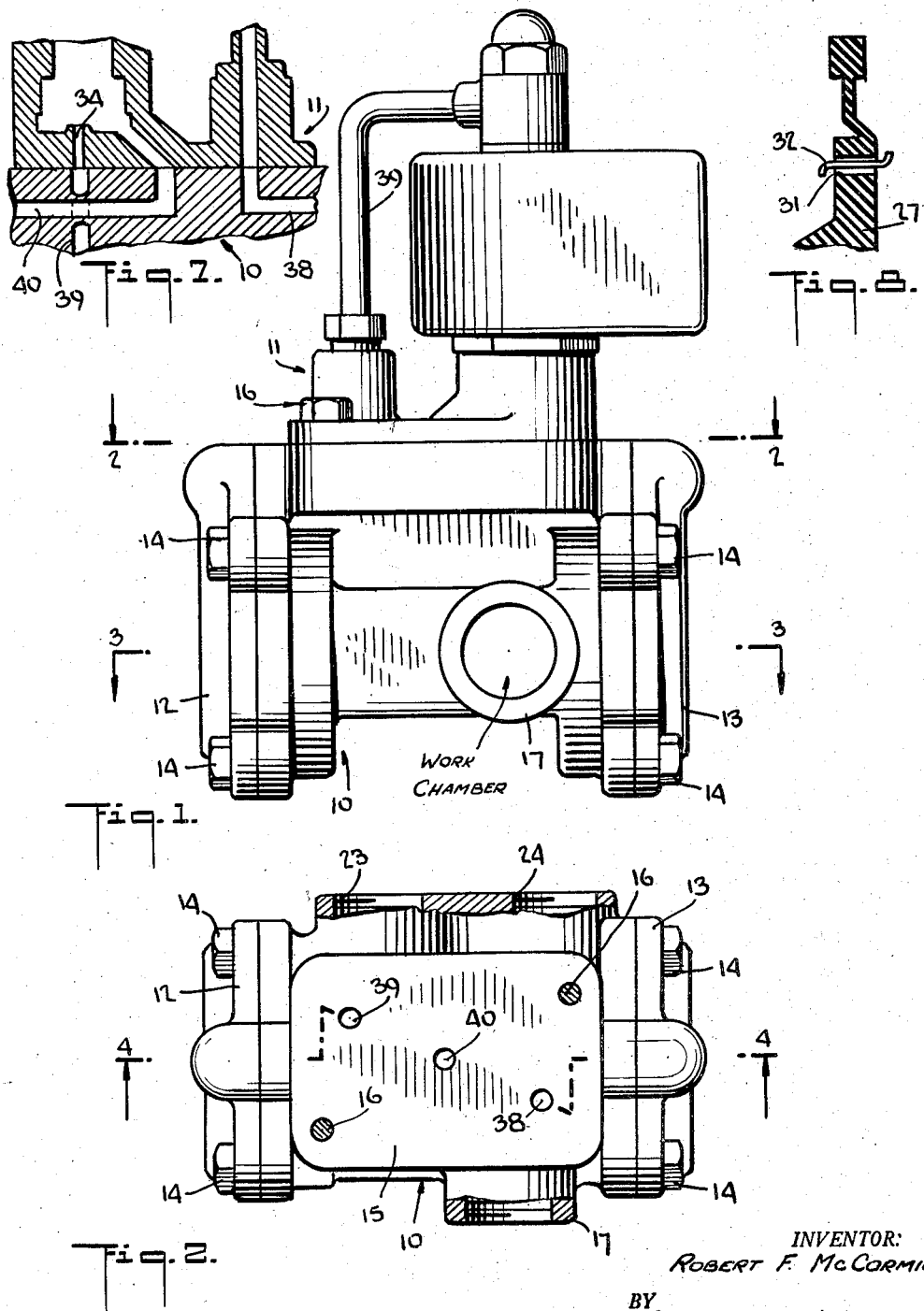

April 14, 1959     R. F. McCORMICK     2,881,801
PILOT-OPERATED THREE-WAY VALVE

Filed April 19, 1956     4 Sheets-Sheet 3

INVENTOR:
ROBERT F. McCORMICK
BY
Frederick Breitenfeld
ATTORNEY

April 14, 1959

R. F. McCORMICK 2,881,801

PILOT-OPERATED THREE-WAY VALVE

Filed April 19, 1956

INVENTOR.
ROBERT F. McCORMICK
BY
Frederick Breitenfeld
ATTORNEY

United States Patent Office 2,881,801
Patented Apr. 14, 1959

2,881,801

PILOT-OPERATED THREE-WAY VALVE

Robert F. McCormick, Livingston, N.J., assignor to Automatic Switch Co., Orange, N.J., a corporation of New York Application April 19, 1956, Serial No. 579,346

9 Claims. (Cl. 137—620)

This invention relates generally to valves, and has particular reference to valves of the type in which the opening and closing of ports in a main valve body are controlled by a pilot valve, preferably solenoid operated.

The invention relates more particularly to a three-way valve whose functioning is intended to connect a work chamber alternately to a source of fluid under pressure and to an exhaust. The work chamber may be connected in any desired or known manner to a cylinder or other mechanism to be actuated by the alternate supply to it, and withdrawal from it, of the actuating fluid.

It is a general object of the invention to provide improvements in a valve construction of this general kind, whereby a valve of smaller overall size can be economically manufactured, and reliably operated at low cost and with a minimum of maintenance attention, notwithstanding the fact that the main valve openings (i.e., to the source of fluid under pressure, to the exhaust, and from the work chamber to the apparatus to be actuated) are of relatively large size.

Another object of the invention is to provide an improved construction whereby the valve may be assembled without packing and may thus operate for long periods of time at low cost while fulfilling its contemplated functions.

Another object of the invention is to provide a valve of the character described, in which the operative movable parts in the main valve body may be optionally formed as piston valves or as diaphragm valves. Where diaphragm valves are used, the advantages heretofore mentioned, including the advantages of a so-called "packless" construction, are coupled with the advantageous features of diaphragm valve operation.

In the preferred embodiment of the invention a three-way pilot valve of a type which is known per se, solenoid actuated, is employed to control the operation of the main valve. The desirable objectives of the invention are achieved, in part, by the manner in which the ports of the pilot valve are connected to the various chambers of the main valve body. These chambers are, in brief, a pressure chamber adapted to be connected to a source of fluid under pressure, an exhaust chamber, and a work chamber. There is a valve seat between the work chamber and the exhaust chamber, another valve seat between the work chamber and the pressure chamber, and a valve for each valve seat, mounted to seat and unseat thereon. The pilot connections are so arranged that when one valve is open, the other is closed, and the novel features of the invention include the means whereby this mode of functioning is attained, and whereby the reseating and unseating of the valves is caused to be speedy and reliable.

I achieved the foregoing objectives and advantages, and such other objects and advantages as may hereinafter appear or be pointed out, in the manner illustratively exemplified in the accompanying drawings, in which—

Figure 1 is a front elevational view of a valve construction embodying the features of the invention and employing valve elements of the diaphragm type;

Figure 2 is a plan view of the main valve body by itself, substantially along the line 2—2 of Fig. 1;

Figure 7 is a fragmentary cross sectional view taken substantially in the direction of Figs. 4 and 6, illustrating the optional alternative mounting of the pilot valve body to reverse the locations of the pressure and exhaust ports thereof;

Figure 8 is an enlarged fragmentary cross-sectional view through a part of the pressure valve element, to show one way of producing the desired bleed hole restriction therein;

Figure 3:
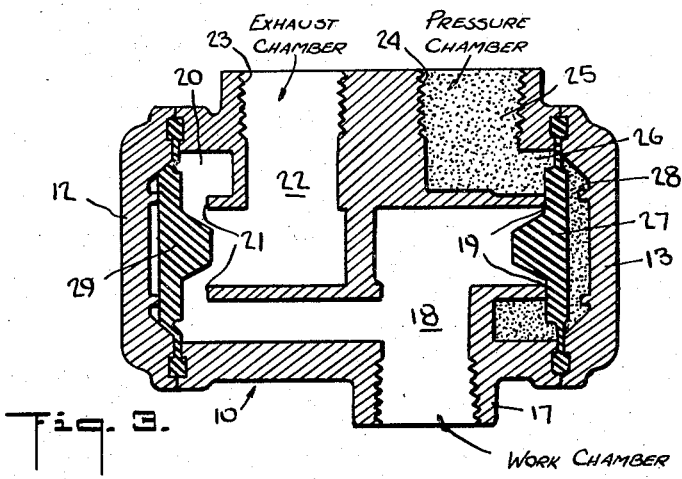
Figure 3 is a cross-sectional view substantially along the line 3—3 of Fig. 1, with the valve elements in one setting thereof.

The invention is applicable to valves of varying sizes and capacities, and for purposes of illustration I have shown in Figs. 1—8 a main valve body 10 having a length of approximately 4 inches, the pilot valve body 11 being of corresponding dimensions. The valve body 10 may be formed and assembled in any desired manner, and I have illustratively shown a construction in which a pair of substantially parallel opposite end walls 12 and 13 are secured to the medial part of the body by studs 14 or the like.

In the valve body 10 herein chosen for illustration, it is provided with a flat face 15 adapted to abut against a similar flat face of corresponding size on the pilot valve body 11. A pair of symmetrically arranged studs or similar fasteners 16 (see Figs. 1 and 2) serve to connect the pilot valve body 11 to the main valve body 10 in a separable fashion, for purposes hereinafter to be set forth.

The interior of the main valve body 10 is provided with partitions defining various chambers and openings as best indicated in Fig. 3. Extending from the side of the valve body facing the viewer in Fig. 1 is a connector opening 17 by means of which communication can be established with the cylinder or other apparatus to which an actuating fluid under pressure is to be intermittently supplied. The opening 17 communicates on the inside of the valve body with a chamber 18 which may be designated a "work chamber." The portion of the chamber 18 at the right side of Figs. 3–6 terminates in a valve seat 19 in front of and facing the end wall 13 of the valve body. The opposite end of the chamber 18, at the left of Figs. 3–6, terminates in an annular space 20 surrounding a valve seat 21 in front of and facing the end wall 12 of the valve body. For purposes of symmetry, the valve seats 19 and 21 are thus arranged in opposed relation with their axes in alignment, but this is not at all essential to the proper functioning of the valve.

Communicating with the space within the confines of the valve seat 21 is an exhaust chamber 22 terminating in a connector opening 23 projecting from the side of the valve body opposite the connector opening 17 (see Figure 2). Alongside the opening 23 there is a similar opening 24 leading on the interior of the valve body to a pressure chamber 25, this chamber being in communication with the annular space 26 surrounding the valve seat 19.

The exhaust opening 23 is adapted to be connected, by pipe conduits or otherwise, to a point of exhaust or atmosphere. The pipe connection 24 is adapted to be connected by similar suitable pipe connections to a source of actuating fluid under pressure. The fluid may be liquid or gaseous, and may be used at any desired suitable pressure.

Figure 5:
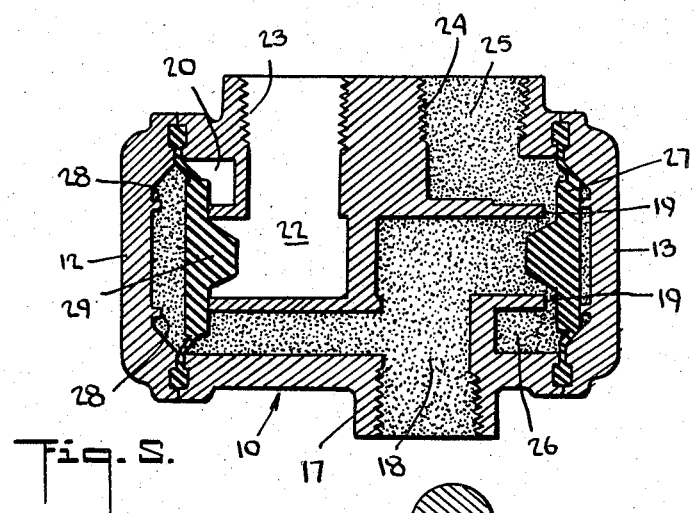
Figures 5 and 6 are views similar to Figs. 3 and 4, respectively, showing the valve elements in the opposite setting.

Each of the valve seats 19 and 21 is provided with a diaphragm valve mounted in axial relation for seating and unseating with respect to the valve seat. The diaphragm valve element 27 is secured peripherally to the valve body 10 beneath the end wall 13 so that it may move from the seated position on the valve seat 19 (Fig. 3) to the unseated position (Fig. 5). The anchored periphery of the valve 27 lies radially beyond the annular space 26, whereby the marginal part of the valve constitutes an annular barrier between the annular space 26 and the region behind the valve. The inner face of the end wall 13 is provided with projecting parts 28 serving as abutments to limit the opening movement of the valve 27 as indicated in Fig. 5. This also limits the contraction in volume of the space behind the valve, when the valve moves from its seated to its unseated position.

There is a similar diaphragm valve 29 mounted in association with the valve seat 21 and movable in similar fashion between the open or unseated position shown in Fig. 3 and the closed or seated position shown in Fig. 5.

For a purpose to be explained hereinafter, each of the valves 27 and 29 is provided with a bleed opening. Thus, near its periphery, to establish communication with the annular space 20, the valve 29 is provided with the bleed hole 30. In a similar relative position the valve 27 is provided with a bleed hole 31. The latter is purposely smaller than the hole 30, and from a manufacturing standpoint a convenient manner of accomplishing this result is to make the holes 30 and 31 of equal basic dimensions and to mount a loose space-occupying wire 32 within the hole 31, as best indicated in Fig. 8. The wire 32 is preferably bent at its ends to keep it in a position extending loosely through the hole 31.

The valve element 27 may be designated a pressure valve since it is operatively interposed between the pressure chamber 25 and the work chamber 18. The valve element 29 may be designated an exhaust valve, since it is operatively interposed between the work chamber 18 and the exhaust chamber 22.

Figure 4:
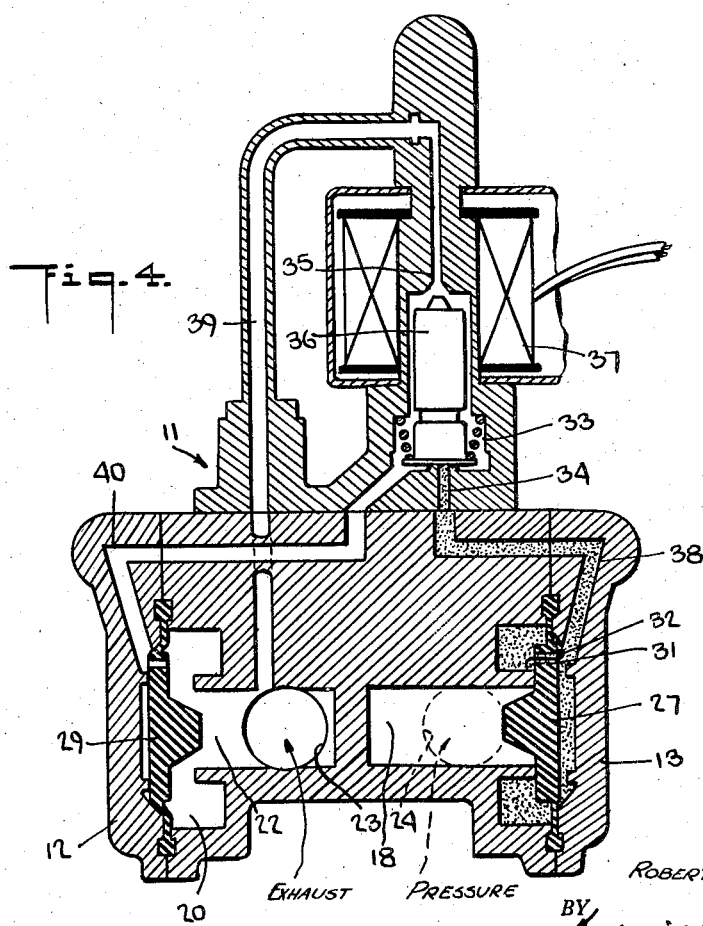
Figure 4 is a cross-sectional view substantially along the line 4—4 of Fig. 2, showing the parts in the relationship of Fig. 3.
Figure 6:
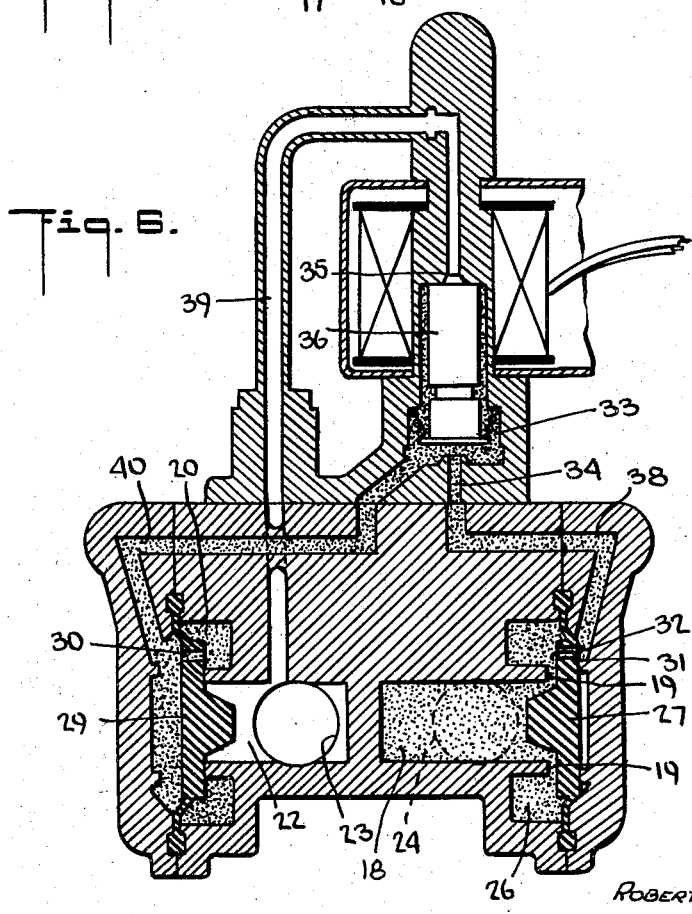

Referring to Figs. 4 and 6, it will be observed that the pilot valve body 11 is provided with a substantially cylindrical chamber 33 provided with opposed aligned ports 34 and 35. Depending upon whether the valve body 11 is mounted upon the main valve body as indicated in Figs. 3-6 or in the alternative position indicated in Fig. 7 (resulting from a rotation of the pilot valve body 11 through 180 degrees), one of the ports 34, 35 is a pressure port, the other an exhaust port. In the arrangement of parts indicated in Figs. 3-6, the port 34 is the pressure port, and the port 35 is the exhaust port.

Mounted within the chamber 33 there is a reciprocable valve element 36 which moves between two positions in each of which it covers one of the ports and uncovers the other. Thus, in Fig. 4, the pressure port 34 is sealed, the exhaust 35 is uncovered; in Fig. 6, the pressure port 34 has been uncovered, while the exhaust port 35 is closed. The valve element 36 is constituted of a solenoid core and the reciprocatory movements are brought about by energizing and de-energizing the solenoid in well known fashion. The coils of the solenoid are indicated at 37.

In the valve bodies passages are provided to define various communications between the chamber 33 of the pilot valve body and portions of the interior of the main valve body. One such communication is indicated at 38 and leads from the rear of the pressure valve 27 to the pressure port 34. There is another communication, which I have designated 39, extending from the exhaust chamber 22 to the exhaust port 35. A third communication, constantly open and not subject to obstruction at any time by movements of the solenoid core 36, is designated 40. It extends from the rear of the exhaust valve 29 to the interior of the pilot valve body at 33.

Upon reference to Fig. 2, it will be observed that the communications 38, 39 and 40 are so arranged that they lie equally spaced and in a straight line as they cross the plane of the flat surface 15. The constantly open communication 40 is at the center. The alignment 38, 39, 40 is symmetrical with respect to the studs 16, so that it is possible for the pilot valve body to be disconnected from the main valve body, rotated through 180 degrees, then reconnected. This is indicated in Fig. 7. The effect of this is to reverse the functions of the ports 34 and 35. In Fig. 7 the port 34 is the exhaust port, while the port 35 (not shown Fig. 7) is the pressure port. Assuming that under normal conditions the pressure port is to be closed by the pilot valve element 36, this result will be accomplished in Figs. 3-6 when the element 36 is in the lowered position, and it will be accomplished in Fig. 7 when the element 36 is in the raised position. In the former case, for example, the solenoid may be considered to be de-energized under normal conditions; while in the latter case the solenoid would be energized under normal conditions. Whether one condition or the other is to prevail depends upon the requirements of the particular installation in connection with which the valve is used.

The operation and advantageous functioning of the valve will be understood upon reference to Figs. 3-6. In each of Figs. 3 and 4 the solenoid is shown de-energized, as a result of which the valve element 36 covers the pressure port 34 and uncovers the exhaust port 35. The fluid under pressure in the pressure chamber 25 has leaked through the bleed hole 31 in the pressure valve 27 and has occupied the space behind the valve (i.e., the region between the valve 27 and the end wall 13 of the valve body), as a result of which the valve 27 is held against the valve seat 19. It will be noted that the valve seat 19 and the valve 27 are so related to each other, positionally, that in the normal unstressed condition of the diaphragm the valve is seated upon the seat 19. This prevents fluid under pressure from flowing to the work chamber 18 and to any apparatus with which it may be connected. Simultaneously, it will be observed that the region behind the exhaust valve 29 is connected through communication 40, chamber 33, exhaust port 35, and communication 39 with the exhaust chamber 22, as a result of which any fluid under pressure that may previously have been within the work chamber 18 has pressed the valve 29 into the unseated position shown in Figs. 3 and 4. It will be noted that the valve seat 21 and the valve 29 are so related to each other, positionally, that in the normal unstressed condition of the diaphragm the valve is unseated and relatively remote from the seat 21. The work chamber 18 is thus in free communication with the exhaust chamber 22.

The positional relationships of diaphragms and valve seats, as above described, assures a complete exhaust of the fluid when the parts are in the setting of Figs. 3-4, and a firm closing of the pressure supply at the same time.

Assuming now that the solenoid is energized, the valve element 36 instantaneously rises to the position of Fig. 6, uncovering the pressure port 34 and sealing the exhaust port 35. This immediately establishes a direct connection between the communication 38 and the communication 40, as a result of which the fluid behind the pressure valve 27 flows directly through the bleed hole 30 in the exhaust valve 29 into the annular chamber 20. Because of the fact that the hole 30 is larger than the hole 31, the space behind the pressure valve 27 is evacuated faster than fresh fluid can enter it from the annular space 26 through the bleed hole 31. Accordingly, the pressure valve 27 shifts immediately to the setting of Fig. 6, thus establishing a direct connection between the pressure chamber 25 and the work chamber 18. Simultaneously, fluid under pressure builds up behind the exhaust valve 29 faster than it can leak through the bleed hole 30 into the annular space 20, as a result of which the valve 29 moves at once into the seated position shown in Figs. 5 and 6.

Assuming now that the solenoid is again de-energized, the fluid behind the exhaust valve 29 is immediately exhausted, allowing the fluid in the work chamber 18 to press the exhaust valve 29 to the unseated position of Figs. 3 and 4. At the same time, the communication 38 having been sealed off at the port 34, pressure immediately builds up behind the pressure valve 27 and restores this element to the seated position shown in Figs. 3 and 4.

The shifting of the parts from the relationships of Figs. 3 and 4 to those of Figs. 5 and 6, and back again, can be achieved with great rapidity and reliability, with a minimum of wear and tear, and at low cost.

The operation is the same when the pilot valve body is in the alternate position indicated in Fig. 7, except that the condition of Figs. 3 and 4 is established when the solenoid valve element 36 is in the raised position (solenoid energized), and the condition of Figs. 5 and 6 is established when the element 36 is in the lowered position (solenoid de-energized).

Figure 9:
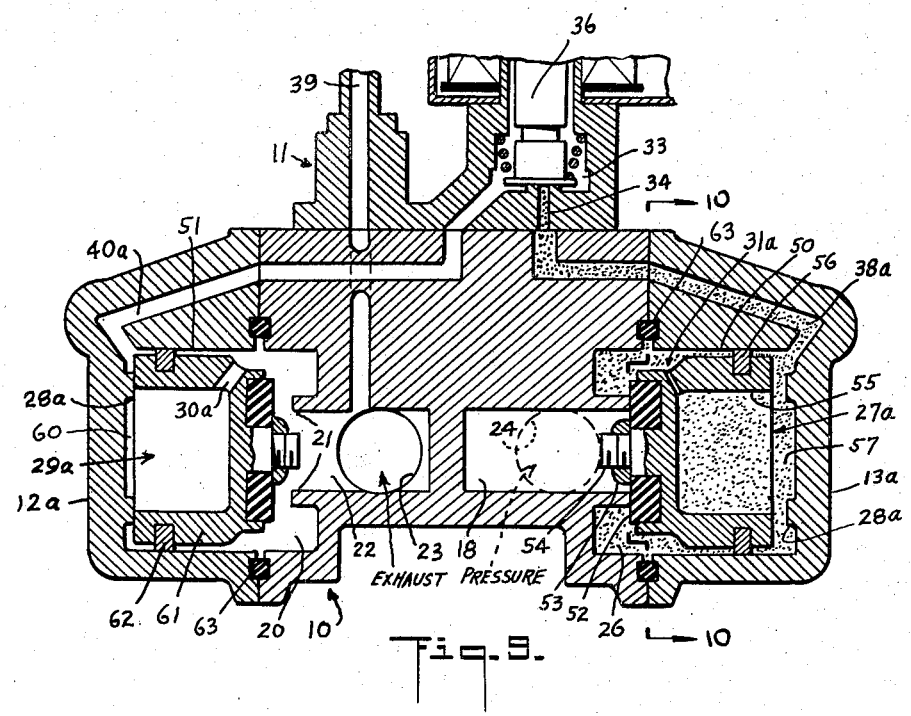
Figure 9 is a view similar to Figure 4, with parts of the pilot valve structure omitted for the sake of compactness of illustration, showing how the invention may be embodied in a valve in which the valve elements are of the piston type.
Figure 10:
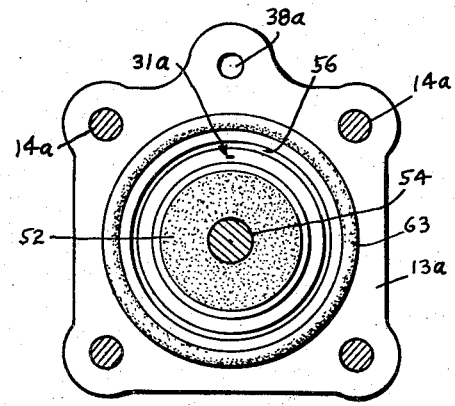
Figure 10 is a cross-sectional view substantially along the line 10—10 of Figure 9.

In Figs. 9 and 10 I have indicated the manner in which many of the advantageous features of the invention may be achieved in a construction in which piston valves are used instead of diaphragm valves. Since the main valve body (except for its opposite end walls) and the pilot valve body are the same as in Figs. 1-8, the same reference numerals are employed to designate the valve body as a whole (10), the pilot valve body 11, the work chamber 18, the valve seat 19, the annular space 26 surrounding it, the valve seat 21, the annular space 20 surrounding it, the exhaust chamber 22, the exhaust opening 23, pressure inlet 24, the pilot valve chamber 33, the pilot valve port 34, and the solenoid core 36.

The end walls 12a and 13a of the main valve body 10 are of slightly modified shape to define cylindrical bores 50 and 51 within which piston valve elements 27a and 29a reciprocate. The valve 27a is the pressure valve, mounted to seat and unseat with respect to the valve seat 19. The area that comes into contact with the seat 19 may be composed of suitable non-metallic material, if desired, as exemplified by the ring-like element 52 held in position by the nut 53 screw-threaded onto the threaded projection 54 formed on the piston. The rearwardly extending part of the piston may be a skirt 55, as shown, provided with a suitable piston ring 56. The parts 55 and 56 constitute an annular barrier between the region 57 behind the valve and the annular space 26 around the valve seat 19. A bleed hole 31a extends through the valve, establishing a restricted but constant communication between the region 57 and the annular space 26. Projections 28a on the end wall 13a limit the unseating movement of the valve.

The exhaust valve 29a is similarly constructed and mounted, its unseating movement being limited by the projections 28a on the end wall 12a, and a bleed hole 30a, larger than the bleed hole 31a, establishing a restricted but constant communication between the region 60 behind the valve and the annular space 20 surrounding the valve seat 21. The skirt part 61 of the valve, and the piston ring 62, constitute a barrier between the space 20 and the rear space 60.

To facilitate manufacture and replacement servicing, the bleed holes 30a and 31a may be formed of equal dimensions and the restricted area of the bleed hole 31a may be achieved by means of a wire as hereinbefore described and as indicated in Fig. 8.

The securement of the end walls 12a and 13a to the valve body 10 may be achieved by studs 14a (Fig. 10), and it is preferable to employ O-rings 63 to establish a fluid-tight connection. Other appropriate rings or expedients may be employed, as may be considered desirable or necessary.

The functioning of the valve structure of Fig. 9 is the same as that which was described in connection with Figs. 1-8. There is a communication 38a between the pressure port of the pilot valve and the region 57 behind the pressure valve 27a, this communication being controlled by the position of the solenoid core 36. There is a communication 39 between the exhaust port of the pilot valve (not shown in Fig. 9) and the exhaust chamber 22, this communication being also controlled by the solenoid core 36. And there is a permanently open communication 40a from the interior 33 of the pilot valve to the region 60 behind the exhaust valve 29a. The parts are shown in Fig. 9 in a setting corresponding to that shown in Fig. 4.

It is to be understood that many of the details herein described and illustrated may be modified by those skilled in the art without necessarily departing from the spirit and scope of the invention as expressed in the appended claims.

Having thus described my invention and illustrated its use, what I claim as new and desire to secure by Letters Patent is:

1. In a pilot-operated three-way valve: a main valve body provided with partitions defining an exhaust chamber, a pressure chamber adapted to be connected to a source of fluid under pressure, and a work chamber; a first valve seat between the work chamber and the exhaust chamber, said valve seat surrounding a space that communicates with the exhaust chamber and being surrounded by an annular space that communicates with the work chamber; an exhaust valve mounted to seat and unseat on said first valve seat solely by fluid pressure and having a part forming an annular barrier between said annular space and the region behind the valve; a second valve seat between the work chamber and the pressure chamber, said valve seat surrounding a space that communicates with the work chamber and being surrounded by an annular space that communicates with the pressure chamber; a pressure valve mounted to seat and unseat solely by fluid pressure on said second valve seat and having a part forming an annular barrier between said annular space and the region behind the valve; the valves being unconnected to one another and capable of independent seating and unseating; a pilot valve body provided with opposed pressure and exhaust ports and a reciprocable valve element adapted in each setting to close one of said ports and uncover the other; a communication between the pressure port and the region behind said pressure valve, a communication between the exhaust port and said exhaust chamber, and a constantly open communication between the interior of the pilot valve body and the region behind said exhaust valve; said exhaust and pressure valves being each provided with a bleed hole establishing constant communication between the region behind the valve and the annular space around its valve seat.

2. In a valve of the character described, the structure defined in claim 1, in which the bleed hole in the exhaust valve is larger than that in the pressure valve.

3. In a valve of the character described, the structure defined in claim 1, in which said pressure and exhaust valves are arranged in opposed relation with their axes in alignment, the main valve body being provided with substantially parallel opposite end walls toward which the valves move when they unseat, each end wall having raised abutments to limit the movement of the valve adjacent to it and thereby limit the contraction in volume of the region behind the valve.

4. In a valve of the character described, the structure defined in claim 1, in which each of the pressure and exhaust valves is a diaphragm valve operated solely by fluid pressure and which has an anchored periphery lying radially beyond the annular space surrounding the valve seat.

5. In a valve of the character described, the structure defined in claim 1, in which each of the pressure and exhaust valves is a springless diaphragm valve operated solely by fluid pressure and whose anchored periphery lies radially beyond the annular space surrounding the valve seat, and in which the bleed holes have substantially equal dimensions and the area of the pressure valve bleed hole is diminished by a wire loosely mounted therein and extending through it.

6. In a valve of the character described, the structure defined in claim 1, in which each of the pressure and exhaust valves is a springless piston valve, the main valve body being provided with cylindrical bores within which said piston valves reciprocate.

7. In a valve of the character described, the structure defined in claim 1, in which the main valve body and the pilot valve body are separably connected and have abutting outer faces, said communications having parts that lie in alignment and equally spaced along said abutting surfaces, the constantly open communication being the one in the middle, whereby a rotation of the pilot valve body through 180 degrees will reverse the locations of its pressure and exhaust ports.

8. In a pilot-operated three-way valve: a main valve body provided with partitions defining an exhaust chamber, a pressure chamber adapted to be connected to a source of fluid under pressure, and a work chamber; a valve seat between the work chamber and the exhaust chamber, and a valve seat between the work chamber and the pressure chamber; a valve for each seat and having a space behind it, one being a pressure valve mounted to connect the pressure chamber with the work chamber when unseated, the other being an exhaust valve mounted to connect the work chamber with the exhaust chamber when unseated the valves being springless and operated solely by fluid pressure; a pilot valve body provided with opposed pressure and exhaust ports and a reciprocable valve element adapted in each setting to close one of said ports and uncover the other; a communication between the space behind the pressure valve and said pressure port, a communication between the exhaust chamber and said exhaust port, and a constantly open communication between the space behind the exhaust valve and the interior of the pilot valve body; said pressure valve being provided with a bleed hole establishing constant communication between the pressure chamber and the space behind the pressure valve, and said exhaust valve being provided with a larger bleed hole establishing constant communication between the work chamber and the space behind the exhaust valve.

9. In a valve of the character described, the structure defined in claim 8, in which each of the pressure and exhaust valves is a diaphragm valve, the pressure valve and its seat being so related to each other, positionally, that in the normal unstressed condition of the diaphragm the valve is seated, the exhaust valve and its seat being so related to each other, positionally, that in the normal unstressed condition of the diaphragm the valve is unseated.

References Cited in the file of this patent

UNITED STATES PATENTS

| | | |
|---|---|---|
| 653,187 | Smith | July 3, 1900 |
| 1,501,331 | Gulick | July 15, 1924 |
| 2,200,824 | Herman | May 14, 1940 |
| 2,273,924 | Bowen | Feb. 24, 1942 |
| 2,426,065 | Stevens | Aug. 19, 1947 |
| 2,641,281 | Phillips | June 9, 1953 |
| 2,693,814 | Richards | Nov. 9, 1954 |